(12) United States Patent
Fujisaki et al.

(10) Patent No.: US 7,761,662 B2
(45) Date of Patent: *Jul. 20, 2010

(54) CACHE MEMORY DEVICE AND MICROPROCESSOR

(75) Inventors: Koichi Fujisaki, Kanagawa-ken (JP); Hideo Shimizu, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/314,403

(22) Filed: Dec. 10, 2008

(65) Prior Publication Data

US 2009/0100226 A1 Apr. 16, 2009

Related U.S. Application Data

(63) Continuation of application No. 11/477,398, filed on Jun. 30, 2006, now Pat. No. 7,480,777.

(30) Foreign Application Priority Data

Jun. 30, 2005 (JP) ............................. 2005-191654

(51) Int. Cl.
*G06F 13/00* (2006.01)
*G06F 13/28* (2006.01)

(52) U.S. Cl. ............... 711/118; 711/156; 711/E12.041; 711/E12.017

(58) Field of Classification Search ........................ None
See application file for complete search history.

(56) References Cited

U.S. PATENT DOCUMENTS

2006/0026356 A1* 2/2006 Okawa et al. ............... 711/128
2007/0005895 A1 1/2007 Fujisaki et al.

FOREIGN PATENT DOCUMENTS

JP 10-269140 10/1998
JP 2004-120307 4/2004

OTHER PUBLICATIONS

Tsunoo et al., "Cryptanalysis of Block Ciphers Implemented on Computers with Cache," International Symposium on Information Theory and Its Application, Xi'An, PRC (Oct. 7-11, 2002), pp. 803-806.

* cited by examiner

*Primary Examiner*—Kevin Verbrugge
*Assistant Examiner*—Eric S Cardwell
(74) *Attorney, Agent, or Firm*—Finnegan, Henderson, Farabow, Garrett & Dunner, L.L.P.

(57) ABSTRACT

A cache controller is connected to a processor and a main memory. The cache controller is also connected to a cache memory that can read and write at a speed higher than the main memory. The cache memory is provided with a plurality of cache lines that include a tag area storing an address on the main memory, a capacity area storing a capacity value of a cache block, and a cache block. When a read request is executed from the processor to the main memory, the cache controller checks whether the requested data is present in the cache memory or not. A cache capacity determination unit determines a capacity value for the cache block and supplies to a capacity area.

6 Claims, 5 Drawing Sheets

FIG.1
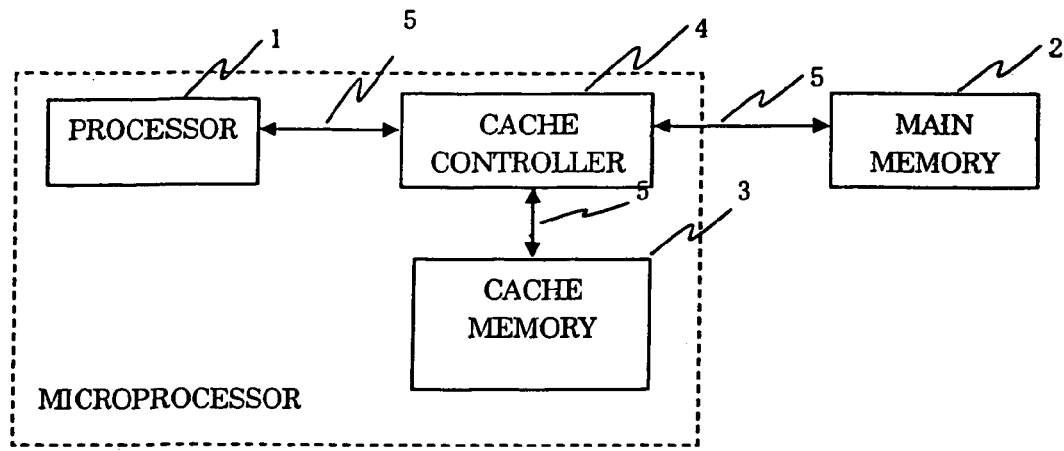
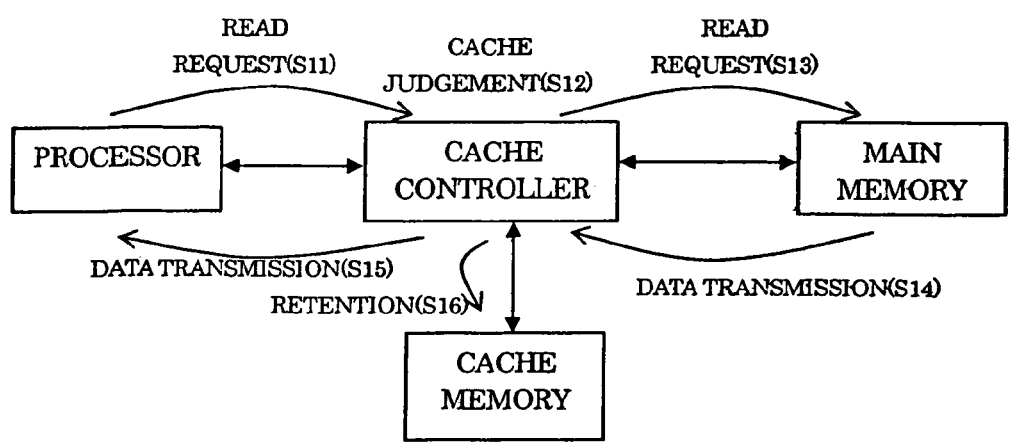
Fig. 2(a)
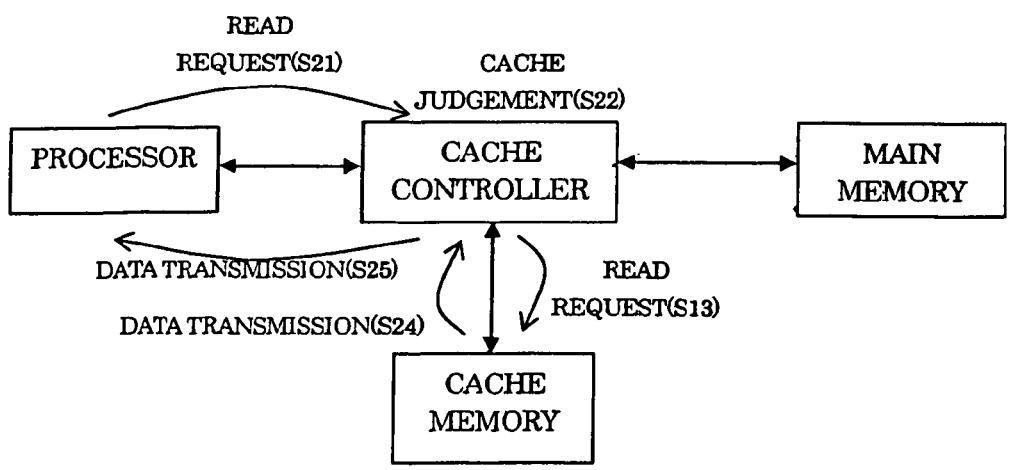
Fig. 2(b)

CACHE MEMORY DEVICE AND MICROPROCESSOR

CROSS-REFERENCE TO RELATED APPLICATIONS

This is a continuation of application Ser. No. 11/477,398, filed Jun. 30, 2006, now U.S. Pat. No. 7,480,777 which is incorporated herein by reference.

This application is based upon and claims the benefit of priority from the prior Japanese Patent Application No. 2005-191654, filed on Jun. 30, 2005; the entire contents of which are incorporated herein by reference.

DESCRIPTION OF RELATED ART

The present invention relates to a cache memory device that controls capacities of the cache lines of a cache memory and a microprocessor.

Caching, such as provided with a cache memory and a cache controller, is used when a memory access such as read or write is executed from a processor to a main memory. Instead of continually reading programs and data that are repeatedly used in the processor from relatively slow main memory, the programs or data can be stored in a high-speed cache. Because a processor must wait while data that are utilized in an operation are written to or read from the main memory, the operation of the processor is impeded. When the caching is used, rather than making an access to the slower main memory, high-speed cache memory is available. As a result, the processing time for a given operation by the processor can be shortened. Accordingly, when caching is used, the capability of the processor can be improved, and many recent computers are provided with the ability to do caching.

An existing cache controller is provided with a tag storage area that includes address information of data in the cache memory, and flags showing the state of data in the cache memory. The controller also includes a comparison operation unit that compares an address being accessed and the content of the tag storage area. The cache controller determines, at the time of memory access, whether data are in the cache memory or not. If data are in the cache memory at the time of memory access, it is called a cache hit. When data are not in the cache memory or data in the cache memory is in a state that cannot be used for some reason, it is called a cache miss. The ratio of cache hits to the number of memory accesses is called the hit rate.

At the time data is read, a processor using a cache, instead of accessing a low speed main memory, reads data in a high speed cache memory to use in an arithmetic operation. The cache memory stores data for an address that has been accessed, and exchanges data stored in the cache memory for more recently accessed data according to predetermined rules. Thus, when data first accessed in main memory are accessed again, the data is accessed in cache memory. As a result, the processing time varies depending on whether data are in the cache memory or not.

Caching was originally used to speed up data reading speed as mentioned above. However, in JP-A-10-269140(KOKAI), a caching method similar to that discussed above is disclosed where some, but not all, of a plurality of cache memories are selectively used to intentionally control the hit rate. The busy rate of the processor is controlled to maintain the processing capability of the processor at a constant level. In the proposed system, in order to make the processor load substantially constant, the processor load is observed, an observation result is given to the cache-controller, and the cache controller, based on the result, controls the number of available cache memories. Thus, in the proposed method, the number of caches is varied to change the total capacity of the cache, and thereby the hit rate of the cache is varied.

In this method, when various data items are repeatedly accessed a small number of times, the cache hit rate can be lowered. However, when the same data are accessed frequently, only a cache miss is generated only once, and after that a cache hit is generated. Accordingly, the cache hit rate is not lowered when the same data are accessed frequently.

Furthermore, JP-A-2004-120307(KOKAI) proposes another example where the number of cache misses used in a cryptogram decoder is made similar to the number of caches for accessing an arbitrary plain text. This is done in order to prevent cryptanalysis by a technique known as a cache attack. The method controls the hit rate of the cache so the caching behavior of the processor does not reveal information that can be used to decrypt cipher texts.

It is thus necessary in this method to lower the hit rate of the cache; as a result, it is not possible to fully take advantage of the cache.

The existing technologies that intentionally suppress high-speed reading performance due to cache hits are in demand for particular applications. This demand is present in spite of the fact that they cause some of the benefits of caching to be unavailable.

BRIEF SUMMARY OF THE INVENTION

There is provided, a cache memory device connected to a processor and a main memory, comprising a cache memory having a plurality of cache lines, each cache line including a data storage area for storing data read out from the main memory, a tag storage area for storing all or part of an address where the data is stored in the main memory, and a capacity storage area for storing a capacity value of the data storage area; a comparison operation unit configured to generate comparisons of the addresses stored in the tag storage areas with a requested address contained in a read request from the processor, the comparisons using the capacity values stored in the capacity storage areas, and, if a comparison indicates an address in an identified tag storage area coincides with the requested address, to instruct an identified data storage area corresponding to the identified tag storage area to read data; and a capacity value determination unit configured to determine the capacity values for the capacity storage areas and to store the determined capacity values in the capacity storage areas.

There is further provided a cache memory device connected to a processor and a main memory, comprising a cache memory having a plurality of cache lines, each cache line including a data storage area for storing data read out from the main memory, a tag storage area for storing all or part of an address where the data is stored in the main memory, and a lead address storage area for storing a lead address of the data storage area; a comparison operation unit configured to generate comparisons of the addresses stored in the tag storage areas with a requested address contained in a read request from the processor, the comparisons using the lead addresses in the lead address storage areas, and, if a comparison indicates an address in an identified tag storage area coincides with the requested address, to instruct an identified data storage area corresponding to the identified tag storage area to read data; and a lead address determination unit configured to determine the address values for the lead address storage areas and to store the determined lead addresses in the lead address storage areas.

BRIEF DESCRIPTION OF THE DRAWINGS

FIG. 1 is a functional block diagram showing a system consistent with an embodiment of the invention.

FIGS. 2(a) and 2(b) are diagrams schematically showing a process of a cache controller, consistent with an embodiment of the invention.

DETAILED DESCRIPTION OF THE EMBODIMENTS

Figure 3:
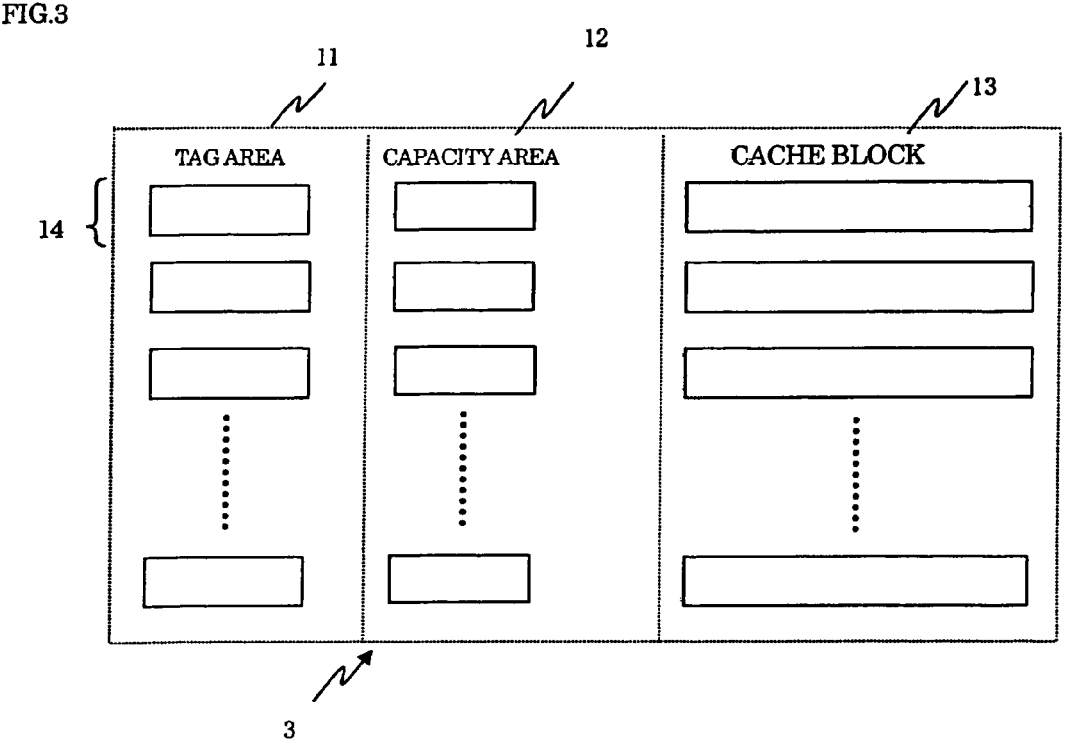
FIG. 3 is a diagram showing a structure that a cache memory can use to store data, consistent with an embodiment of the invention.

In general, there are three methods for using a cache as an address management system. They are the direct map method, the fully associative method and the n-way associative method. The methods are well known. The methods differ somewhat in the management of cache memories. However, the methods have in common that an address on an address bus and an address in a tag area stored in the cache memory are compared, to see if the addresses coincide with one another. The coincidence between the addresses can mean either that the addresses are identical, or that the difference between the addresses is within some tolerance. The description below can be used with all the described methods of caching.

FIG. 1 is a functional block diagram showing a system consistent with an embodiment of the invention. A processor 1 carries out an arithmetic operation for executing a program. A main memory 2 is a relatively low speed and large capacity memory that is constituted of a semiconductor element for storing program instructions that are executed by the processor 1 and program data that are utilized when a program is executed (hereinafter, both program instructions and program data are generically referred to as data). The main memory 2 can be realized, for example, with a DRAM. A cache memory 3 is a memory higher in speed and smaller in capacity than the main memory 2, which is used to temporarily store some of the data stored in the main memory 2. The cache memory 3 is constituted of a volatile semiconductor element and can be realized, for example, with an SRAM.

A cache controller 4 is connected through a bus 5 to each of the processor 1, the main memory 2 and the cache memory 3. The cache controller 4 controls the cache memory 3. For example, when a data access is made from the processor 1 to the main memory 2, the cache controller 4 accesses the cache memory 3 to determine whether the data are stored in the cache memory 3 or not. If the data are stored (a "cache hit"), the cache controller 4 reads data from the cache memory 3 and sends the data to the processor 1. If the data are not stored in the cache memory 3 (a "cache miss"), the cache controller 4 stores the data, read from the main memory 2, in the cache memory 3.

An outline of the operation of the cache controller 4 will be described with reference to FIGS. 2(b)a and 2(b). FIG. 2(a) shows an example processing flow in the case of a cache miss and FIG. 2(b) shows an example processing flow in the case of a cache hit.

First, processing for a cache miss will be described with reference to FIG. 2(a). The processor 1 issues a read request to main memory 2, the read request including a read address for data stored on the main memory 2, at step (S11). The cache controller 4 determines whether or not the data stored at the read address are stored in the cache memory 3, at step (S12). The cache controller 4, when it determines the data are not stored in the cache memory 3, that is, determines a cache miss, transfers the read request for the address to the main memory 2, at step (S13). The main memory 2 (or the controller thereof) receives the read request, reads data from a memory region that the read address indicates, and sends data read from the address to the processor 1, at step (S14). The cache controller 4 receives the data and transfers it to the processor 1, at step (S15). Then, the cache controller 4 causes the data and the address in the main memory 2 corresponding to the data to be stored in the cache memory 3, at (S16). According to the operations described above, new data are stored in the cache memory 3.

Next, processing for a cache hit will be described with reference to FIG. 2(b). The processor 1 issues a read request to main memory 2, the read request including a read address for data stored on the main memory 2, at step (S21). The cache controller 4 determines whether or not the data stored at the read address are stored in the cache memory 3, at step (S22). The cache controller 4 determines the data are stored in the cache memory 3, that is, determines a cache hit. The cache controller 4 then executes a read request to the cache memory 3, which also stores data corresponding to the read address, at step (S23). The cache memory 3, when it receives the read request from the cache controller 4, reads the stored data and sends it to the cache controller 4, at step (S24). The cache controller 4 then transfers the data to the processor 1, at step (S25). According to the operations described above, data are read from the cache memory 3.

The processor 1, cache memory 3 and cache controller 4 may be provided in the same package as an arithmetic operation unit as shown by the dotted line in FIG. 1. Furthermore, though not shown in the drawing, the cache memory 3 and cache controller 4 may be provided in the same package.

Next, a structure that the cache memory 3 can use to store data is shown in FIG. 3.

The cache memory 3 is provided with a plurality of cache lines 14, which have a tag storage area such as tag area 11, a capacity storage area such as capacity area 12 and a data storage area such as cache block 13. In the cache block 13, a copy of data read from the main memory 2 is stored. A predetermined fixed memory capacity (for instance, 256 bit) is assigned to the cache block 13. Tag area 11 stores upper order address bits, or the full address, where the data in corresponding cache block 13 are stored on the main memory 2. In the capacity area 12, a capacity value indicates the amount of the cache block 13 that is actually utilized, (for instance, 128 bits out of 256). The capacity value stored in capacity area 12 may be determined and stored at the time of initialization of the cache memory. During the usage of the cache memory 3, the capacity value can be modified to vary the capacity of the cache block 13, without modifying the data actually stored in cache block 13.

For example, when the predetermined fixed memory capacity of the cache block 13 is 256 bits, and the minimum variable capacity is 8 bits, a new capacity can be selected from any one of candidate capacity values 256, 128, 64, 32, 16 and 8 bits. When the cache memory is in use and the capacity is 32 bits, a new capacity can be selected from any one of candidate capacity values 32, 16 and 8 bits. The reason for the capacity values being power-of-two integers will be described below.

By restricting the capacity values in this manner, it can be guaranteed that, when a cache hit occurs, the data are necessarily present in cache block 13.

Figure 4:
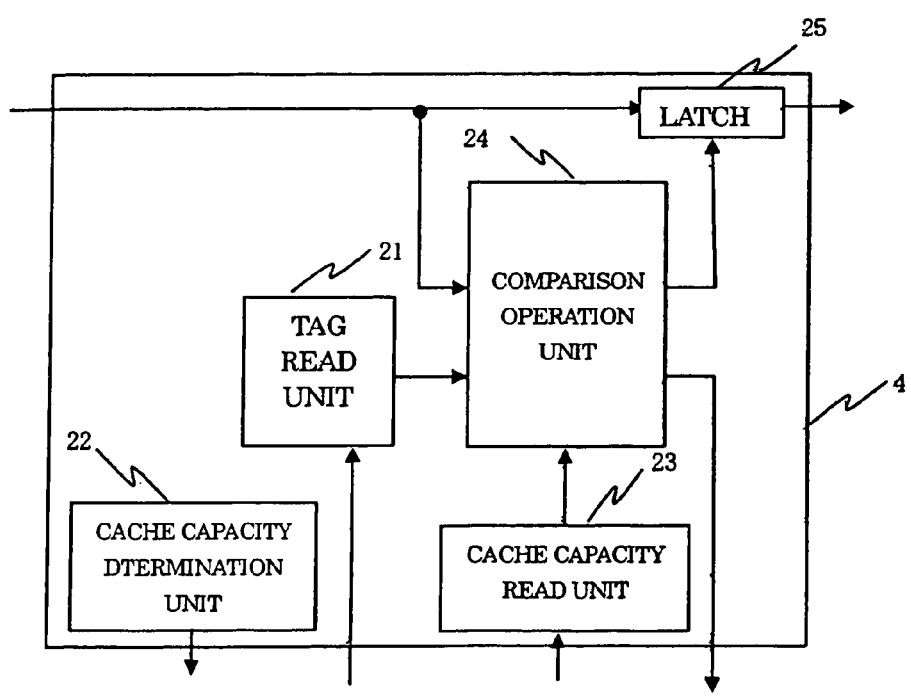
FIG. 4 is a block diagram showing functions in the cache controller, consistent with an embodiment of the invention.

The cache blocks 13 have a physically fixed capacity. However, when the cache blocks are actually used (generally for reading data), a subset of the physical capacity can be used, by only using part of the cache block 13. The cache lines also store other information, such as state information indicating that reads of the cache memory 3 are either permitted or inhibited FIG. 4 shows a block diagram of functional units within the cache controller 4, consistent with an embodiment of the invention.

A tag read unit 21 reads each of addresses from each of tag areas 11 of the cache memory 3.

A cache capacity determination unit 22 is used to determine each of capacities of the respective cache blocks 13. Here, the cache capacity determination unit 22 is constituted so that a random number circuit or a pseudo-random number circuit is used to randomly select from various candidate capacity values. Rules for determining what values are acceptable candidates are described below.

A cache capacity read unit 23 reads each value of capacities from each of capacity areas 12 of the cache memory 3.

A comparison operation unit 24 compares a read address, which is sent when a read request is executed, with addresses available in cache memory 3. To do the comparison, the comparison operation unit 24 determines whether the read address falls within a range of addresses available in cache lines 14. The available range of addresses in a given cache line 14 is determined by the address read by tag read unit 21 from tag area 11, and the capacity value read by cache capacity read unit 23 from capacity area 12. When the comparison results for all the cache lines 14 indicate the address is not stored in the cache memory 3, the comparison operation unit 24 transmits a signal indicating the address is not stored in the cache memory 3 to a latch circuit 25. If a comparison generated by the comparison operation unit 24 indicates cache memory 3 contains the read address, i.e. a cache hit occurs; the comparison operation unit 24 executes a read request to the cache block 13 of the cache line 14 that contains the read address.

The latch circuit 25 is used to temporarily latch an address from the processor 1. When a signal is received from the comparison operation unit 24, the latch circuit 25 outputs a latched address to a bus 5 connected with the main memory 2.

Next, an example of an internal circuit configuration for the comparison operation unit 24 will be described using comparison operation unit 24-1, shown in FIG. 5. The operation of the comparison operation unit 24-1 will be described for one cache line 14. With comparison operation unit 24-1, both the predetermined fixed memory capacity of cache block 13 and the capacity value determined by cache capacity determination unit 22 are a power-of-two integer. The capacity value determined by the cache capacity determination unit 22 should be less than or equal to the predetermined fixed memory capacity of the cache block 13. In accordance with an embodiment of the invention, when a capacity value determined by the cache capacity determination unit 22 is expressed in binary, an address width is used as the capacity area, and the lower order bits of the address width are all set to "1" while the higher order bits are all "0."

An XOR element 31 outputs 0 when two inputs are identical and 1 when they are different. The XOR elements 31 are arranged in parallel as shown to compare the same digits of individual addresses. In particular, one input from each of the XOR elements 31 is set to an address bit from the address bus 5 and the other input set to an address bit read from the tag area 12. The output of XOR element 31 is 0 when the input address bits are identical, and 1 when they differ. Therefore, XOR elements in this manner can generally be used to determine if two addresses coincide at each bit.

However, a read address from the processor 1 may be near, but not identical to, one or more addresses stored in cache lines 14. If the read address is within a range of addresses stored in the cache 3, but not identical to an address in tag area 11, this is still a cache hit. In one embodiment consistent with the invention, the size of the cache blocks is fixed, and only the upper order bits of addresses that are different for every cache block are compared to determine if the read address coincides with an address stored in the cache 3. In another embodiment consistent with the invention, the capacity of the cache blocks 13 can vary, so a fixed number of upper order bits cannot be used to check whether the read address coincides with an address stored in the cache 3. In order to overcome this problem, a comparator can be used, and depending on the capacity of the cache block, the lower address bits can be masked.

Figure 5:
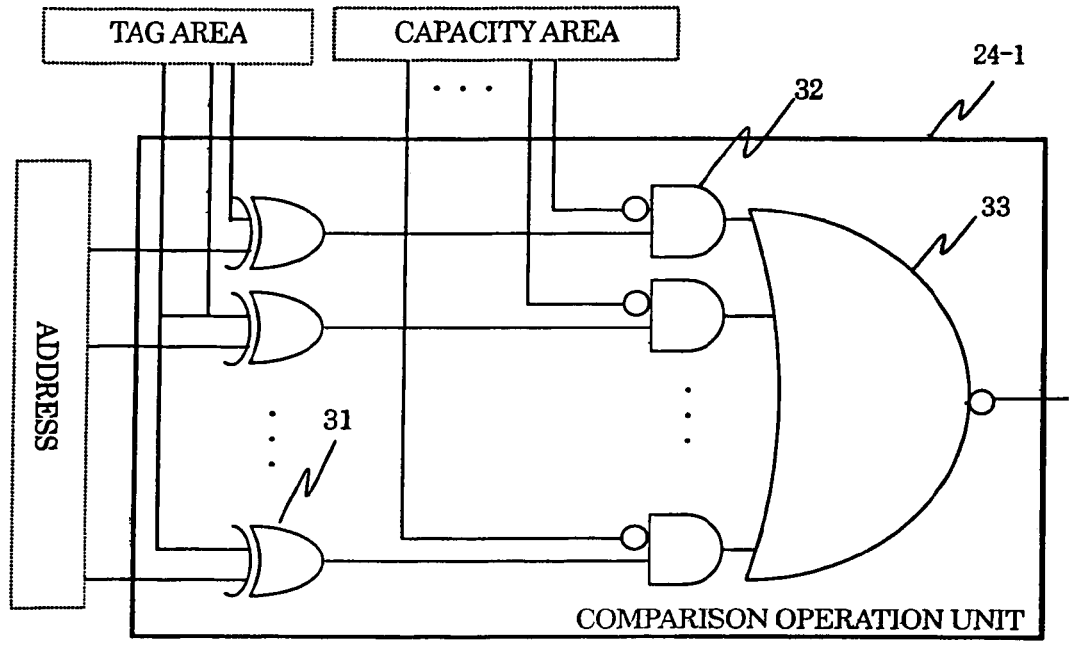
FIG. 5 is an example of an internal circuit configuration of a comparison operation unit, consistent with an embodiment of the invention.

In FIG. 5, an AND element 32 outputs 1 only when two inputs both are 1 and outputs 0 when at least one of two inputs is 0. The AND elements 32 are arranged in parallel as shown in the drawing and outputs of the XOR elements 31 are, respectively, one input of each of the AND elements 32 and the inverted binary capacity values read, from the capacity area 12 are, respectively, the other input of each of the AND elements 32. Thus, AND elements 32 corresponding to the lower order bits up to the bit representing the capacity value all output 0, and the AND elements 32 corresponding to more than the capacity value simply output the value input from the corresponding XOR element.

An output of each of the AND elements is an input to NOR element 33. The NOR element 33 outputs 1 only when all inputs are 0. Thus, when the NOR element 33 outputs 0, there is a cache miss, and, when the NOR element 33 outputs 1, there is a cache hit.

By use of a comparison operation unit 24-1 like this, whether one cache line 14 shows a cache hit or a cache miss can be determined, and, when several comparison operation units 24-1 are used in parallel, a cache hit or cache miss can be found for the whole cache 3 as well. As a result, the capacity of the cache block can be varied.

Figure 6:
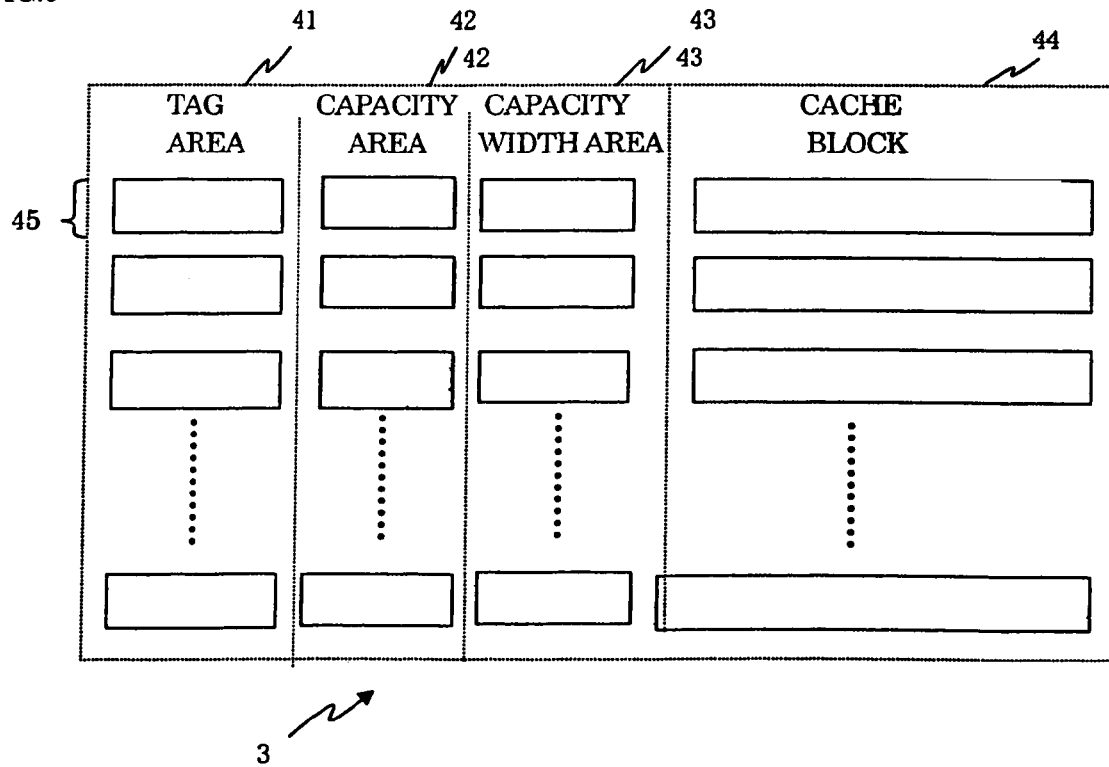
FIG. 6 is another example of a structure that the cache memory can use to store data, consistent with an embodiment of the invention.

Next, another example of a comparison operation unit 24 will be shown. When comparison operation unit 24-2 is used, a cache memory 3 will generally appear as shown in FIG. 6. When the cache memory is compared with that shown in FIG. 3, one difference is that a capacity width area 43 is provided, while the rest of the cache memory has not changed. Thus, a tag area 41, a capacity area 42 and a cache block 44 are the same as the tag area 11, the capacity area 12 and the cache block 13 shown in FIG. 3.

Each of the capacity width areas 43 is provided with a number of bits corresponding to the width of address bus 5. Based on the capacity values of the cache lines 45, the address bus 5, and mask data of the capacity width area 43 are determined. In the mask data, only n bits (where n satisfies $n \geq 1$ and $2^{(n-1)} \leq$ capacity of cache block $< 2^n$) from the lower order bits are set to 1 and remaining bits are set to 0. For instance, when the cache capacity value is 15 bytes, the four lowest order bits become "1" and when the cache capacity is 17 bytes, the five lowest order bits become "1". For this example, it will be assumed that the capacity value may not be a power-of-two integer.

Figure 7:
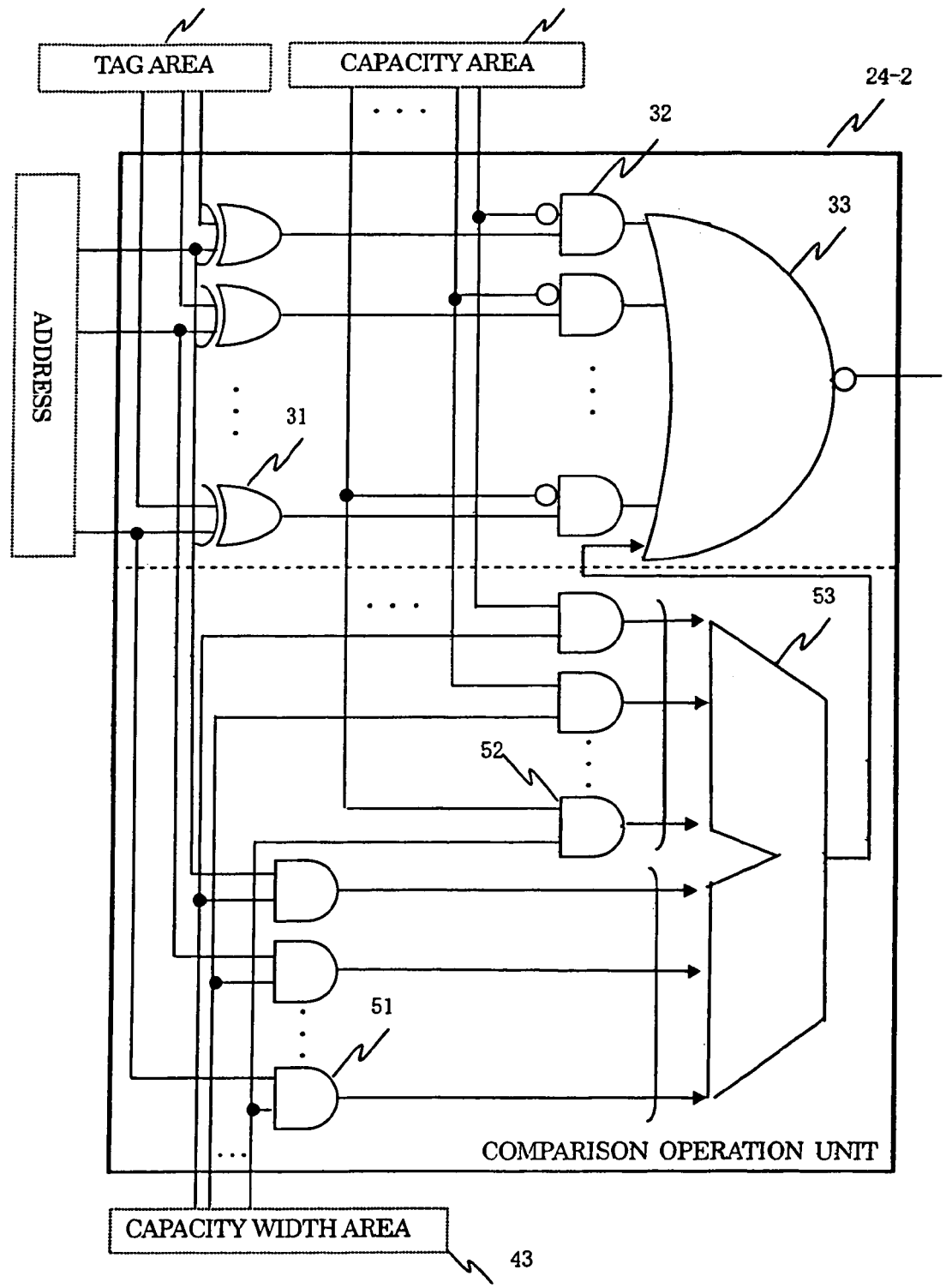
FIG. 7 is a diagram showing an internal circuit configuration of a comparison operation unit, consistent with an embodiment of the invention.

Next, a circuit diagram of a comparison operation unit 24-2 of the example is shown in FIG. 7.

In the example, the portion above the dotted line in the drawing is constituted of XOR elements 31, AND elements 32, and a NOR element 33. However, in this example, one input of the NOR element 33 is an output from a comparator 53. Otherwise, the comparison operation unit 24-2 operates in much the same fashion as comparison operation unit 24-1 in FIG. 5. Therefore, description of the operation of the portion of comparison operation unit 24-2 is omitted, as it is discussed in detail above.

AND elements 51 are arranged in parallel as shown in FIG. 7, and address bits from the address bus 5 are connected to one input and each of bits of the capacity width areas 43 is connected to the other input. The AND elements 51 are arranged in parallel such that the address is effectively output from the lower order bits only, using a bit width stored in the capacity width area 43. The output of the AND elements 51 are combined to form one input of the comparator 53.

AND elements 52 are also arranged in parallel as shown in FIG. 7, a capacity area 42 is connected to one input and each bit of the capacity width areas 43 is connected to the other input. Therefore, with the AND elements 52 arranged in parallel, from the lower order bits of the capacity area 42, by a bit width stored by the capacity width area 43, the capacity value is effectively output. The outputs of the AND elements 52 are combined to form the other input of the comparator 53.

In the comparator 53, as will be seen from the above description, by a bit width stored by the capacity width area 43, the binary address from the address bus 5 and the capacity value from the capacity area 42 are inputted to compare which one is larger. When, as a result of the comparison, the address is larger, "1" is outputted, and, when the address is smaller, "0" is outputted. Then, the output of the comparator 53 is another input in the NOR element 33.

As will be apparent from the above description, in the case of the comparison operation unit 24-1, the comparison result of the lower order address bits is masked. However, in the case of the comparison operation unit 24-2, the lower order address bits are used as well for the comparison. Thus, in the comparison operation unit 24-1, the capacity value can only take on integer values that are powers of two. However, in the comparison operation unit 24-2, all, capacity values that do not exceed the cache block can be used, without limiting them to powers of two. Thus, when using comparison operation unit 24-2, an area that manages the capacity that is actually used by the cache block is added to each of the tag areas. Therefore, the capacity of the cache block that is actually used becomes variable, as managed by the tag area.

In the embodiment described above, the cache memory 3 is assigned to a plurality of cache blocks that have a predetermined fixed memory capacity, and the capacity of each of the cache blocks that is actually used is made variable.

In another embodiment of the invention, the cache memory 3 is formed into cache blocks of different memory capacity, rather than having a fixed memory capacity. The cache blocks can be formed before starting an arithmetic operation into cache blocks having different memory capacities, in a manner demonstrated shown below.

Figure 8:
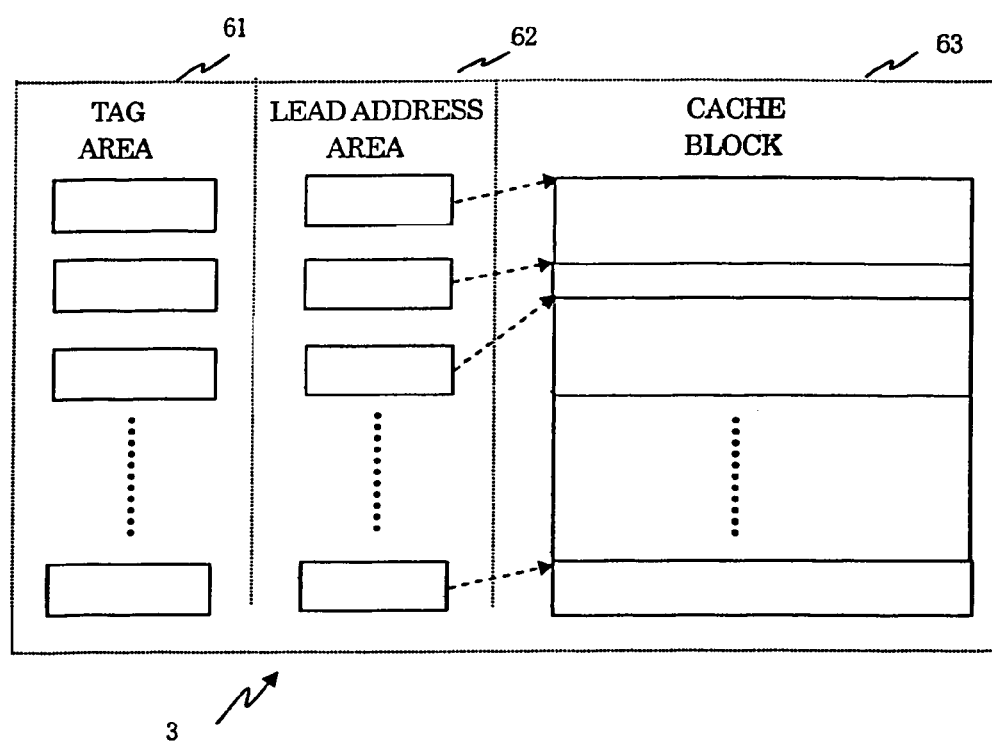
FIG. 8 is a diagram showing another example of a structure that the cache memory can use to store data, consistent with an embodiment of the invention.

In this case as shown in FIG. 8, a capacity of a cache block 63 is determined. A tag area 61, a lead address area 62 of a cache and a cache block 63 can be stored.

The lead address area 62 is provided with the lead address on the cache memory ~3 of the corresponding cache block 63. When the lead address is stored in the lead address area 62, before using the cache memory 3, a capacity value for each of the cache blocks 63 that are associated with the respective tag areas 11 is determined using a random number circuit, and the capacities are recorded in a sequence based on the order of the respective tag areas. This sequence can be used to determine a lead address for each of the cache blocks 63.

Specifically, when the capacity values up to the n−1st tag in the sequence are summed up, the capacity of the cache memory 3 assigned up to the n−1st tag in the sequence can be obtained. The cache block 63 that the nth tag area 61 corresponds to starts at the next available address of the cache block 63, i.e. at the next address after that used by the n−1st tag area. Thus, by summing up the capacities of the cache blocks 63 from the 0th up to n−1st tag in the sequence, an offset can be obtained. The offset can be used as the lead address of the cache memory 3 of the nth tag area 61. Therefore, relative to the previous embodiment, a more complicated control unit is needed, including, for example, an operation portion (not shown) for obtaining the capacity of a cache block 63 from two lead addresses. However, since a lead address of the cache block 63 can be varied, the cache memory 3 allows for assigning a capacity to a certain cache block that is larger than the present capacity of the cache block. In addition, this embodiment reduces the number of restrictions on the capacity of the cache blocks.

A cache unit including, for example, cache memory 3 and cache controller 4 according to the embodiment described above can be applied to, for example, a cryptographic operation. This will result in a more secure operation, by improving the resistance of the unit to ciphering analysis. Next there is provided an example in which the present embodiment is applied to a cryptographic operation.

When an operation unit such as a processor provided with a cache unit is used in a cryptographic operation, there is an analysis method known as a "cache attack." The cache attack works by analyzing the difference in processing time due to the difference in read times for the main memory 2 and the cache memory 3. Confidential information is extracted during the encryption process, from a relationship between the input data (plain text) and the processing times. The cache attack method will be briefly described below.

Examples of cryptographic algorithms include Data Encryption Standard (DES) or Advanced Encryption Standard (AES). In these algorithms, an operational unit such as a processor that is provided with a cache unit can perform cryptographic tasks by using n converting tables such as the well-known S-BOX. These cryptographic tasks may include an operation where data obtained by dividing a plain text into Pi sections, according to the input width of the converting table. The plain text data are used with a partial key Ki repeated m times as inputs in an XOR operation. The results of the XOR operation of Pi and Ki are used as the input to the converting table. When using one of the n converting tables, for any arbitrary two inputs to the converting table, one of the following formulas will be true. Note that XOR is represented by a "Δ" in these formulas.

$$Pi \Delta Pj = Ki \Delta Kj \qquad (A)$$

$$Pi \Delta Pj \neq Ki \Delta Kj \qquad (B)$$

$$(i \neq j, 0 \leq i \text{ and } j < m)$$

When (A) is true, the converting table for the current step of the operation is same as the converting table used in the previous step of the operation. Data are read from the main memory and held in the cache memory, and a cache hit is obtained. On the other hand, when (B) is true, the converting table for the current step of the operation is different from the converting table that was used in the previous step. Thus, data are read from the main memory but are not stored in the cache memory, so a cache miss is obtained. In other words, since the addresses being accessed for referencing the converting table are different between the cache memory and the main memory, processing times are different between (A) and (B). As a result, by measuring the total processing time, it can be determined whether the values being input m times to the converting table are same or different.

Using a cryptographic algorithm like this, a plain text is selected for input. The input plain text and a randomly generated plain text can be compared to generate a plain text that results in fewer accesses to elements in the converting table. A "key difference" is determined. Since the same converting table is accessed frequently, $Pi \Delta Pj$ is calculated using (A), and the key difference that appeared most-frequently, i.e., the key difference with the shortest cryptographic operation time, is adopted as the correct key difference.

Alternately, a key difference can be determined using many plain texts that access many converting tables. Because the different converting tables are accessed frequently, $Pi\Delta Pj$ is calculated using (B), and the key difference that takes the longest cryptographic operation time is adopted as the correct key difference.

By use of one or both of the methods mentioned above, a key difference can be generated and key information can be extracted from the key difference.

A countermeasure can be applied to the analysis methods of the cache attack described above, when a cache unit according to the embodiment is used This will be described next.

In a cache attack, when the processing time at the cryptographic operation depends only on inputted data and cryptographic information that is used for the cryptographic operation, the attack is generally successful. Therefore, variable processing times can be used as a countermeasure to prevent the cache attack.

One method for varying the processing time is to vary the hit rate of the cache. Thus, the number of accesses to the cache memory 3 and the number of accesses to a low speed memory can be varied. Therefore, the processing time of the cryptographic operation can be varied.

When a cache controller according to the embodiment described above is used to vary the capacity of the cache memory 3, the hit rate of the cache can be varied.

As a result, it is possible to invalidate the presumption that the processing time varies depending only on the input data and cryptographic information used for the encryption. Because the cache attack depends on this presumption, varying the cache hit rate can be a countermeasure to the cache attack.

Furthermore, there is a known attack method called a differential power analysis (DPA) where power consumption during a cryptographic operation of an operation unit such as a processor is measured to extract cryptographic information, such as a key or key difference. Varying processing time is known to be an effective countermeasure to this attack as well.

When the cache controller according to the embodiment described above is applied to an operation unit to vary the hit rate of the cache by varying the capacity of the cache block, the processing time can be varied as well. This technique is effective as a countermeasure to the DPA.

As described above, according to embodiments of the invention, even when various data items are repeatedly accessed a small number of times, or even when the same data items are accessed frequently, the hit rate of the cache can be varied.

In the embodiments described above, the hit rate of the cache can be varied. Therefore, the embodiments can be an effective countermeasure to the cache attack and the DPA, when performing cryptographic operations.

The invention is not directly limited to these embodiments. The structural elements may be modified and the invention may be practiced in various ways without departing from the scope of the invention. Additionally, variations can be formed by combining the multiple structural elements disclosed in the embodiment. For example, some elements may be deleted from all the structural elements disclosed in the embodiment. Further, structural elements from the different embodiments may be combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cache memory device connected to a processor and a main memory, comprising:
    a cache memory having a plurality of cache lines, each cache line including a data storage area for storing data read out from the main memory, a tag storage area for storing all or part of an address where the data is stored in the main memory, and a capacity storage area for storing a capacity value of the data storage area;
    a comparison operation unit configured to generate comparisons of the addresses stored in the tag storage areas with a requested address contained in a read request from the processor, the comparisons using the capacity values stored in the capacity storage areas, and, if a comparison indicates an address in an identified tag storage area coincides with the requested address, to instruct an identified data storage area corresponding to the identified tag storage area to read data; and
    a capacity value determination unit configured to determine the capacity values for the capacity storage areas and to store the determined capacity values in the capacity storage areas.

2. The cache memory device according to claim 1, wherein the capacity value determination unit is configured to vary the capacity values stored in the capacity storage areas with the determined respective capacity values.

3. A cache memory device connected to a processor and a main memory, comprising:
    a cache memory having a plurality of cache lines, each cache line including a data storage area for storing data read out from the main memory, a tag storage area for storing all or part of an address where the data is stored in the main memory, and a lead address storage area for storing a lead address of the data storage area;
    a comparison operation unit configured to generate comparisons of the addresses stored in the tag storage areas with a requested address contained in a read request from the processor, the comparisons using the lead addresses in the lead address storage areas, and, if a comparison indicates an address in an identified tag storage area coincides with the requested address, to instruct an identified data storage area corresponding to the identified tag storage area to read data; and a lead address determination unit configured to determine the address values for the lead address storage areas and to store the determined lead addresses in the lead address storage areas.

4. The cache memory device according to claim 3, wherein capacity values for the data storage areas are obtained from the lead addresses, and the addresses compared by the comparison operation unit are determined based on the capacity values.

5. A microprocessor device connected through a bus to a main memory, comprising:

a processor;

a cache memory having a plurality of cache lines, each cache line including a data storage area for storing data read out from the main memory, a tag storage area for storing all or part of an address where the data is stored in the main memory, and a capacity storage area for storing a capacity value of the data storage area; and a cache controller that includes:

a comparison operation unit configured to generate comparisons of the addresses stored in the tag storage areas with a requested address contained in a read request from the processor, the comparisons based on the capacity value stored in the capacity storage areas, and, if a comparison indicates an address in an identified tag storage area coincides with the requested address, to instruct an identified data storage area corresponding to the identified tag storage area to read data; and a capacity value determination unit configured to determine the capacity values for the capacity storage areas and to store the determined capacity values in the capacity storage area.

6. A microprocessor device connected through a bus to a main memory, comprising:

a processor;

a cache memory having a plurality of cache lines, each cache line including a data storage area for storing data read out from the main memory, a tag storage area for storing all or part of an address where the data is stored in the main memory, and a lead address storage area for storing a lead address of the data storage area; and a cache controller that includes:

a comparison operation unit configured to generate comparisons of the addresses stored in the tag storage areas with a requested address contained in a read request from the processor, the comparisons using the lead addresses in the lead address storage areas, and, if a comparison indicates an address in an identified tag storage area coincides with the requested address, to instruct an identified data storage area corresponding to the identified tag storage area to read data; and a lead address determination unit configured to determine the address values for the lead address storage areas and to store the respective determined lead addresses in the lead address storage areas.

* * * * *